United States Patent Office 3,370,637
Patented Feb. 27, 1968

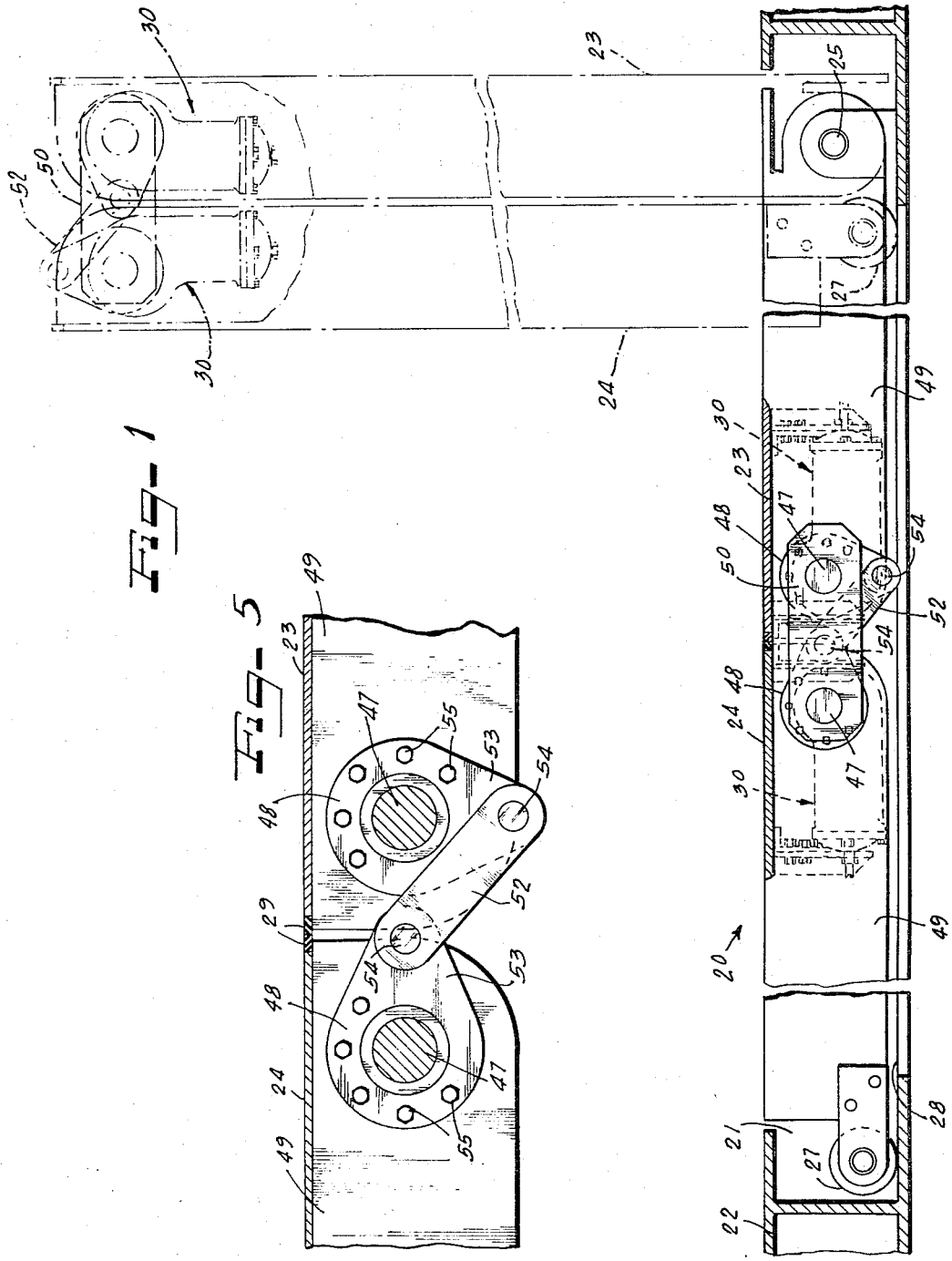

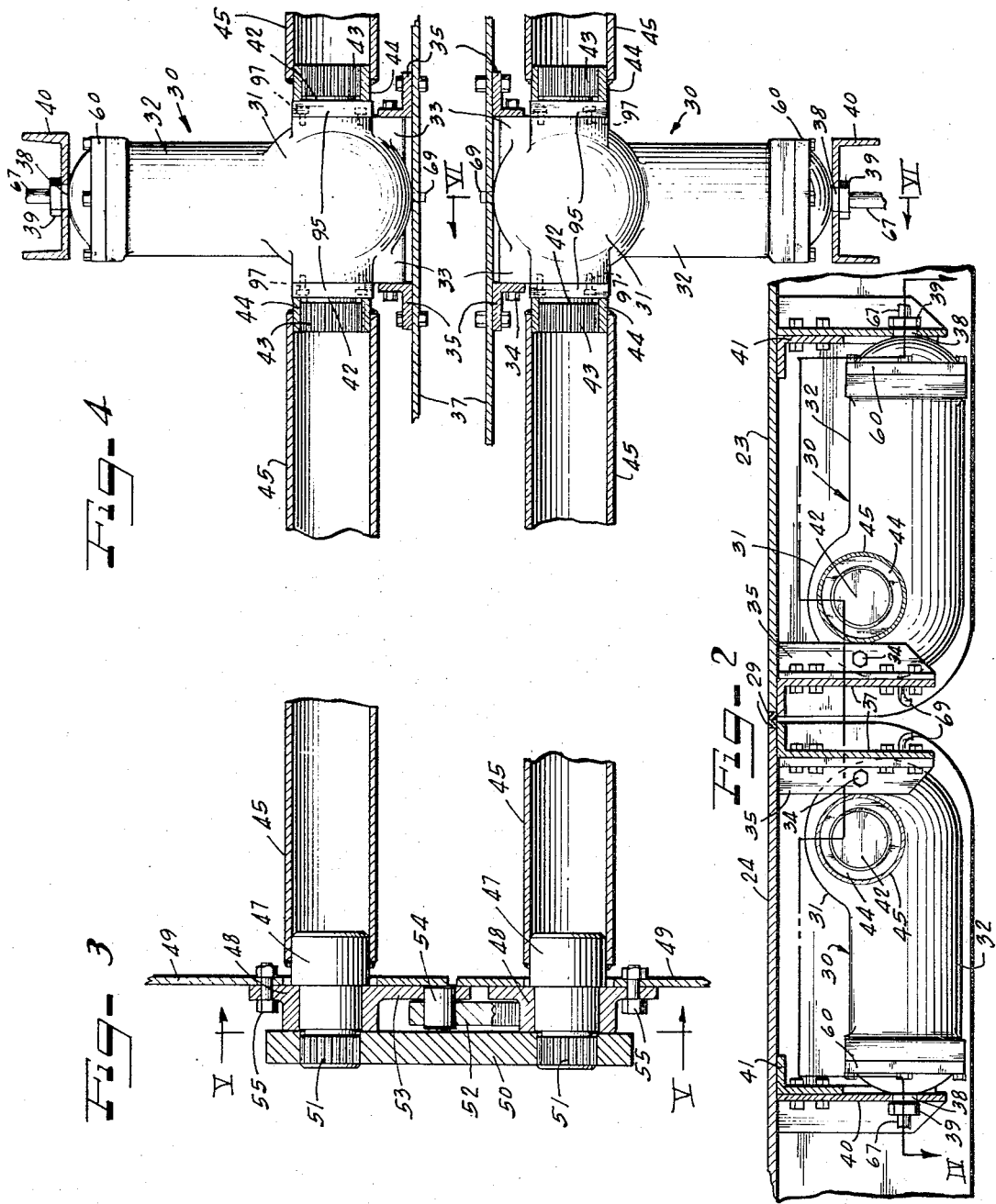

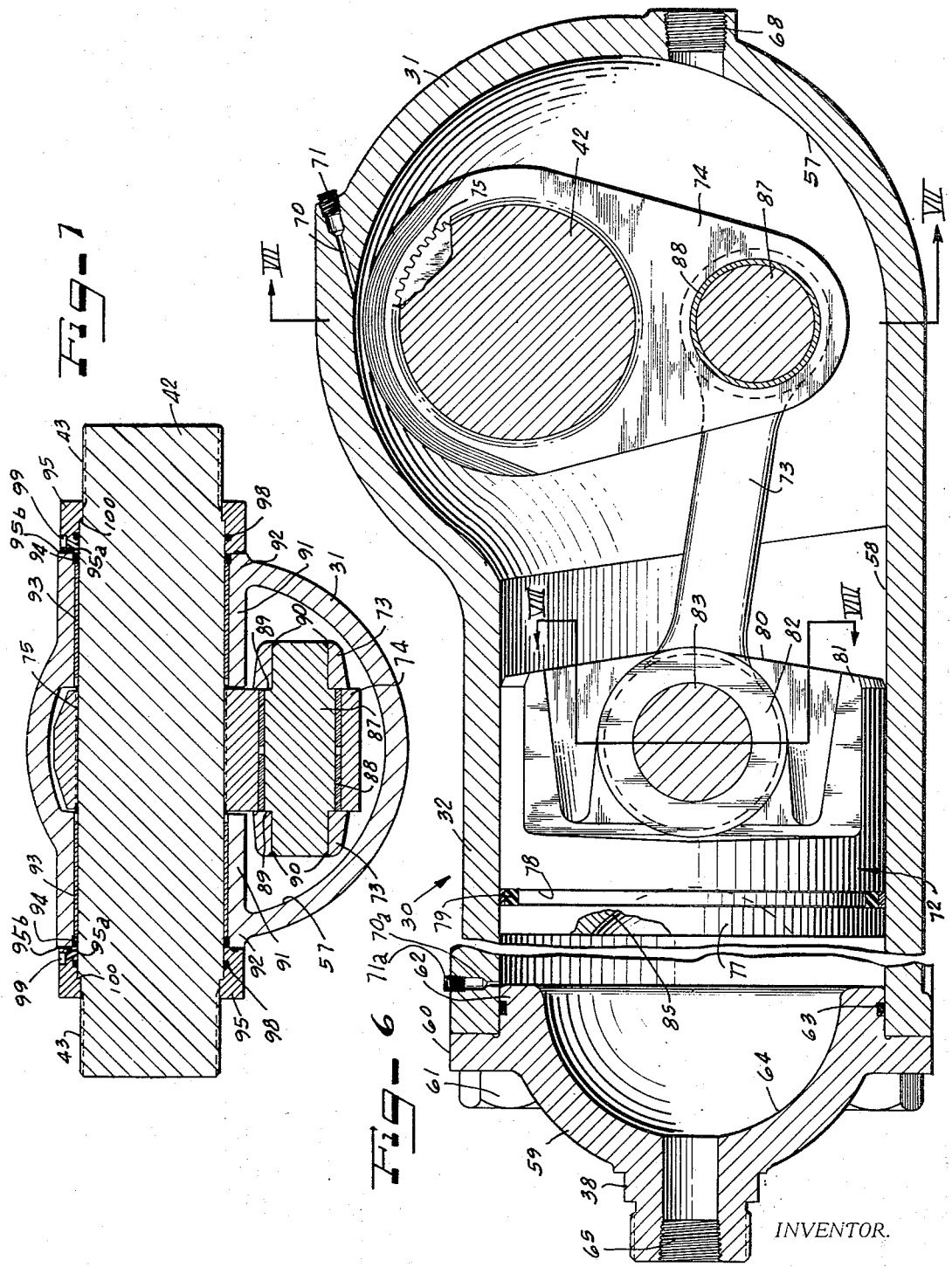

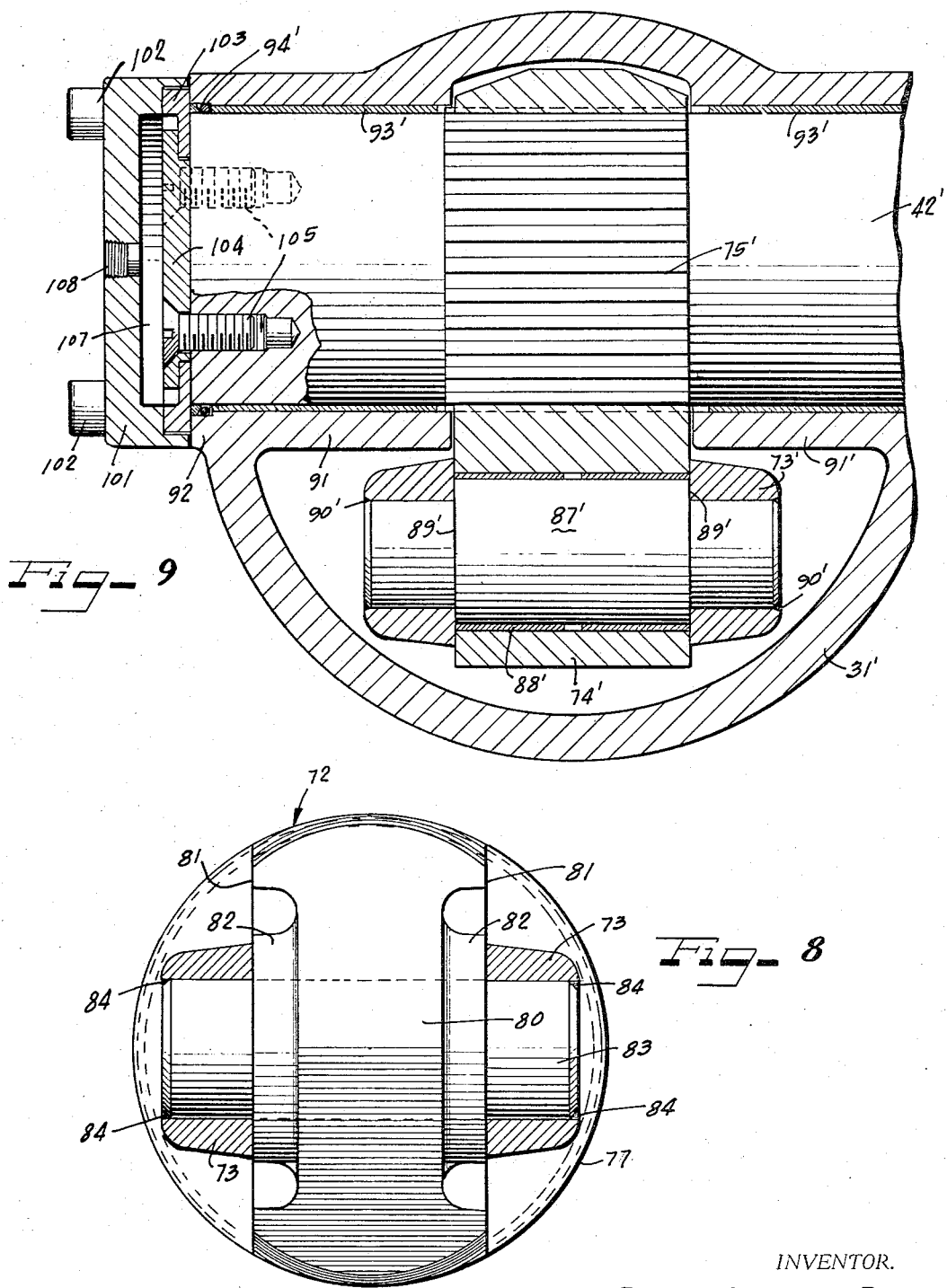

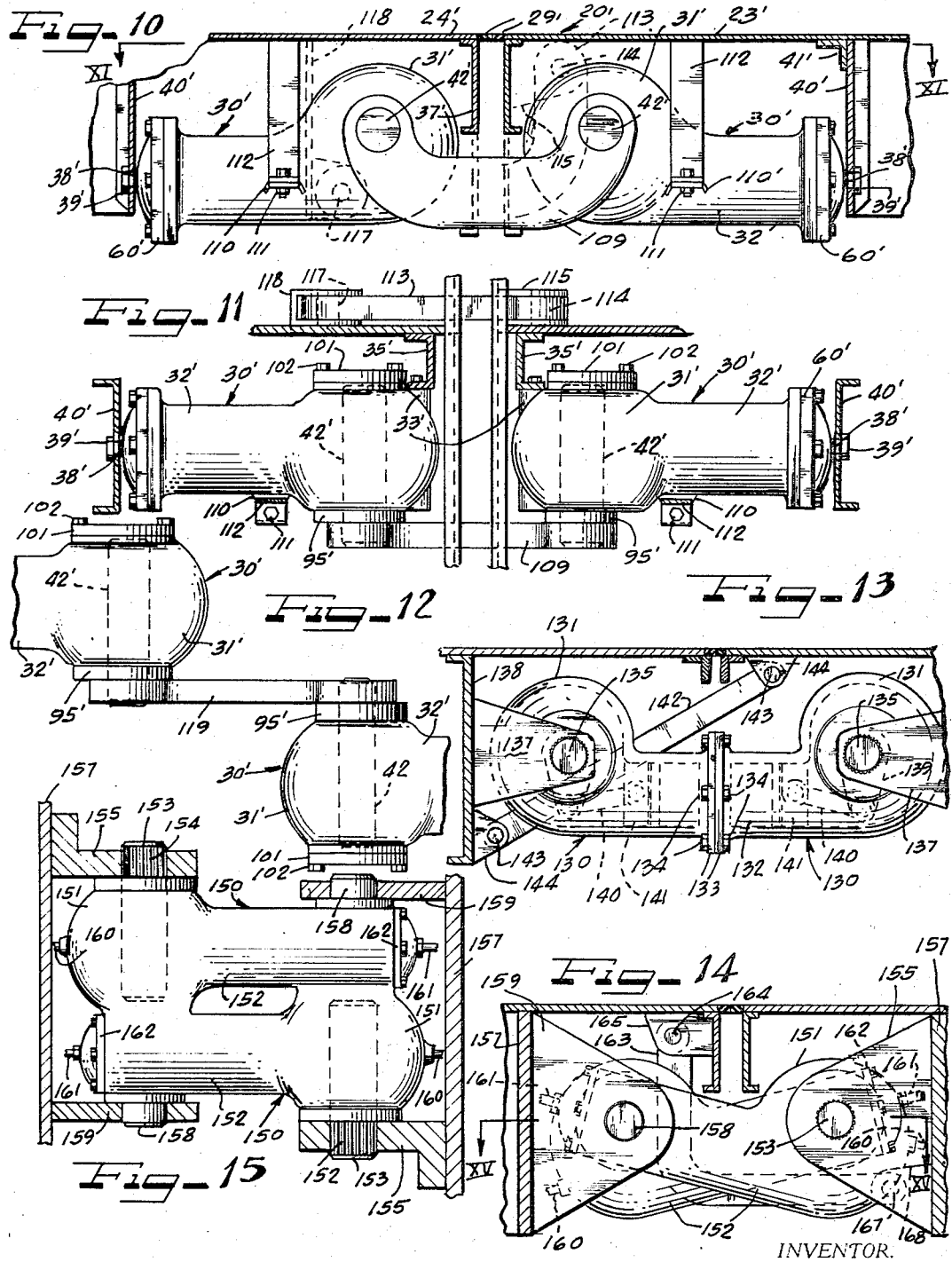

3,370,637
HATCH COVER OPERATION WITH
ROTARY ACTUATORS
Rollin Douglas Rumsey, Buffalo, N.Y., assignor to
Houdaille Industries, Inc., Buffalo, N.Y., a corporation of Michigan
Filed Oct. 7, 1965, Ser. No. 493,856
20 Claims. (Cl. 160—188)

ABSTRACT OF THE DISCLOSURE

Foldable closure panels such as hatch covers are power hinged by piston lever rotary actuators rotatable about respective spaced parallel shafts contiguous to the adjacent edges of the panels, with the shafts coupled rigidly together against relative rotation. Stabilized opening and closing movements of the panels by operation of the actuators is attainable by coordinating link means extending across the joint and pivoted to fixed pivots on the respective panels. Attachment of the actuators to the panels may be in part through means on cylinder end closure attached to the panel frames. A bearing-stabilized piston structure is provided for the actuators.

This invention relates to improvements in means for efficient power operation of hatch covers and other heavy closures of similar type.

One of the problems encountered in actuation of the generally fairly heavy movable sections or panels of hatch covers and the like by power means operable in the fold joints of such closures is the tendency of uneven operation of the actuating means resulting in skewing of the closure panels and thus scuffing and damage to the seal structures. One excellent means for overcoming this problem is to provide the hinged joint with stabilizing gear structure, but there is the ever-present liability of cargo material or other foreign material falling into the gear teeth and possible jamming. Even with guard structure over the gears vulnerability has persisted due to the necessary movement ranges in operation. Further, such gear structures add an appreciable cost factor.

According to the invention, the foldable panels are movable between open and closed positions by actuators which operate in association with respective spaced parallel fixedly connected respective shafts on the panels alongside the joint between their edges with movement-coordinating link means connected to the panels in association with but on pivots separate from the shafts. The actuators are desirably of the crank lever type in which the cylinder heads may have means for connecting them to the frame structure with which associated. The actuators may be rigidly attached together, and the pistons of the actuators desirably have stabilizing bearing portions on slab sided tongues facilitating attachment of connecting rods.

An important object of the present invetnion is to provide a new and improved, simplified, inexpensive, reliable, durable and jam-free construction for effectively stabilizing and coordinating folding action of hingedly connected power-operated hatch cover panels, and the like.

Another object of the invention is to provide new and improved stabilizing and coordinating link means associated with rotary actuators in the hinge joint of hatch covers.

A further object of the invention is to provide new and improved coordinating link structure for foldable hatch covers, and the like, wherein separate but coactive hydraulic actuators afford motivating power for each of a pair of foldable cover or closure members.

Another object of the invention is to provide new and improved rotary actautor means for relatively hingedly power operating foldable hatch cover panels, and the like.

Other objects, features and advantages of the present invention will be readily apparent from the following description of certain preferred embodiments thereof taken in conjunction with the accompanying drawings, in which:

FIGURE 1 is aschematic vertical sectional elevational view through a representative hatch cover assembly embodying features of the invention;

FIGURE 2 is an enlarged fragmentary sectional elevational detail view of the hatch cover of FIGURE 1 in the vicinity of the joint therebetween and showing the piston-lever rotary actuators and their mounting;

FIGURE 3 is an enlarged fragmentary sectional detail view taken substantially on line III—III of FIGURE 1;

FIGURE 4 is a sectional detail view taken substantially on line IV—IV of FIGURE 2;

FIGURE 5 is a sectional elevational view taken substantially along the line V—V of FIGURE 3;

FIGURE 6 is an enlarged fragmental longitudinal sectional view taken substantially along the line VI—VI of FIGURE 4;

FIGURE 7 is a sectional detail view taken substantially along the line VII—VII of FIGURE 6;

FIGURE 8 is a sectional detail view taken substantially along the line VIII—VIII of FIGURE 6;

FIGURE 9 is a sectional detail view similar to FIGURE 7 but showing a modification;

FIGURE 10 is a schematic vertical sectional elevational view showing a modified arrangement of the actuators and coordinating linkage structure;

FIGURE 11 is a top plan sectional view taken substantially on the line XI—XI of FIGURE 10;

FIGURE 12 is a fragmentary plan view similar to FIGURE 11 but showing a modification;

FIGURE 13 is a fragmentary sectional elevational view disclosing another modification;

FIGURE 14 is a fragmentary side sectional elevational view of still another modified arrangement of the actuators; and FIGURE 15 is a sectional detail view taken substantially along line XV—XV of FIGURE 14.

In an illustrative embodiment of the invention as shown in FIGURE 1, a hatch cover assembly 20 is mounted for closing disposition over a hatch opening 21 in a coaming or deck 22. On the other hand, the deck may be a bulkhead or wall and the hatch cover 20 a foldable door or closure for the opening which serves as a doorway or similar access opening. In this instance, the hatch cover 20 comprises two complementary cover sections 23 and 24, wherein the section 23 is pivotally mounted along one edge as indicated at 25 in the deck structure, while the other cover section 24 is provided with suitable antifriction roller means 27 on its remote edge riding rail means 28 provided by the deck, so that the cover sections can be conveniently actuated between the closed full line position shown and the dot-dash open folded position. Although the hatch cover 10 is shown as comprising two sections, it may comprise additional sections in series, as preferred or required.

Powered hinge means are provided in and adjacent to the joint between the cover sections 13 and 14 which lie in side-by-side coplanar relation in the closed condition, with seal means 29 closing the joints watertight. To this end, the cover sections 23 and 24 carry within their adjoining margins complementary operatively aligned and coactively coupled respective actuators 30 which are preferably of piston-lever rotary type. There may be as many paired sets of the actuators located along the joint between the cover members as necessary in view of the length and weight of the cover members.

Each of the actuators 30 includes a head portion 31 (FIGS. 1, 2 and 4) and an elongated crank lever portion 32. Mounting of the respective actuators 30 is effective to house the actuators entirely within the thickness dimension of the associated cover member to enable as nearly as practicable folding of the cover members or panels into face-to-face relation of the inside faces thereof and to minimize or eliminate mechanism clearance required under the cover members in the hatch closing relationship thereof.

Each of the actuators 30 is mounted fixedly within its cover panel with the head portion 31 adjacent to the panel joint and with the crank lever portion 32 extending inwardly away from the joint. Means for attaching the head portion 31 comprise opposite transverse attachment bosses 33 integral with respective opposite side of the outer end of the head portion secured as by means of bolts 34 to mounting brackets 35 carried by a frame member or beam 37 along the joint margin of the cover member. At its inner end, the actuator 30 is attached as by means of a central rearwardly projecting boss 38 and a nut 39 to a mounting bracket 40 secured to a frame beam 41 of the associated cover member.

Each of the actuator head portions 31 is rotatably mounted on a shaft structure which in each instance of this embodiment comprises a short solid shaft portion 42 which extends through the head from side to side and has a splined end portion 43 onto which is engaged splined coupling collar 44 rigidly welded onto the end portion of a tubular shaft extension 45 the opposite end portion of which has fixedly secured coaxially therewith, as by welding, a journal 47 extending through a bearing 48 mounted on an end frame beam 49 of the associated cover member. These parallel shaft structures of the actuators are coupled together non-rotatably by means of a rigid connecting bar 50 attached to the journals 47 provided for this purpose with connecting means in the form of splines 51. Such a connecting bar 50 is desirably connected to each opposite end of the shaft assembly. Thereby, a hinge connection is afforded for the cover sections or panels 23 and 24 and the actuators 30 are operatively coupled.

Ideally, of course, both of the actuators 30 should be capable of perfectly synchronized operation to develop a torque thrust upwardly on the shafts 42 and their connections for opening the cover panels 23 and 24 and, reversely, downward thrust to effect closing of the cover panels. As a practical matter, however, tolerance and system variables in operation may cause one or the other of the actuators 30 to lag behind the other at some point in the operating cycle, and this may not always be the same actuator. In consequence, some skewing or relative motion other than raising and lowering may occur in the cover panels during opening or closing actuation. While this may be wholly unobjectionable in certain installations, it is undesirable where the hatch seals 29 are of a preferred or necessary construction which will not tolerate such uncoordinated movements of the cover panels.

According to the present invention coordinated movements of the cover panels are effectively attained by the provision of a simple coordinating lever system in the hinge joint between the cover panels. In a practical form, one or more rigid coordinating links 52 (FIGS. 1, 3 and 5) suitably located along the joint will have the desired result. For example, one of the links 52 may be mounted adjacent to each of the shaft connecting bars 50. Conveniently, this may be effected by providing on each of the bearing flange members 48 a rigid link attachment ear 53 carrying a pivot pin 54 on the order of a crank pin and on which one respective end portion of the link 52 is pivotally mounted. Since the bearing flanges 48 are fixedly attached to the respective cover panels as by means of bolts 55, the link 52 is, in effect, pivotally connected to the respective cover panel. Further, each of the pivots 54 is spaced from the axis of the adjacent actuator shaft and so located radially from such shaft axis as to compel coordinated opening and closing movements of the cover panels. To this end the pivots 54 are relatively located to dispose the longitudinal axis of the link 52 angularly across a plane which extends through both of the shaft axes.

Although as shown in FIGURE 5, the pivot points for the link 52 are mounted at equal distances away from the actuator shaft axes, these distances may vary, as may also the relative circumferential position. While the left hand pivot 54 in FIGURE 5 is shown as located in the plane in the axes of the actuator shafts and the right hand pivot 54 vertically under the associated actuator shaft axis, location of the pivots 54 may be anywhere within a practical range which will enable functioning of the link 52 without interference with the actuator shaft structure or associated structure in the opening and closing of the connected panels. The length and shape of the link 52 may also be substantially varied. The principal requirement is that the link pivots be in a line which is on an axis diagonally across a line between the actuator shaft axes, whereby to counteract any tendency for uncoordinated relative opening or closing movements of the cover panels. This affords a substantial range of adaptability for various installation clearance dimensions and the bearing load considerations. Optimum results are obtained because the effective lever arm is the maximum attainable at both ends of travel, namely at the opening end and the closing end, while at all intermediate positions the effective lever arm is greater yet. This puts the lowest bearing loads on the link for a given amount of torque to be transferred between the actuators and the link.

Hydraulic operation of the actuators 30 is provided for. To this end, the head portion 31 and the crank lever portion 32 comprise a rugged envelope or housing, desirably in the form of a unitary cast metal body, with the hollow head portion as nearly as practicable spherical to withstand high internal hydraulic operation pressures and defines a chamber 57 (FIGS. 6 and 7). Within the crank lever arm portion 32 is an internal cylinder 58 opening at its inner end into the head chamber 57 and closed at its outer end by a closure cap or cylinder head 59 which centrally has integral thereon the outwardly extending attachment boss 38. A lateral annular attachment flange 60 engages the end of the crank lever cylinder portion 32 and is attached thereto as by means of bolts 61. A centering annular axially extending flange 62 projects inwardly on the cylinder head and telescopes within the outer end margin of the cylinder, with suitable sealing means 63 preventing external hydraulic leakage. Desirably the cylinder head 59 is of semi-sperical burst-resisting shape, in this instance outwardly convex and defining an inner concave hollow space 64.

Driving of the actuator 30 is effected by means of hydraulic pressure fluid introduced alternately into the respective opposite ends of the actuator unit, a hydraulic fluid port 65 extending through the boss 38 at the rear end of the unit for connection with a hydraulic fluid line 67 (FIGS. 2 and 4) in a hydraulic control system, and a part 68 being provided into the front end of the head chamber 57 for connection thereto of a hydraulic fluid line 69. Since the actuator 30 operates as a hydraulically filled system, means for purging air therefrom during filling is desirable, and for this purpose a bleed outlet or port 70 is desirably provided leading from the top of the chamber 57 in the head portion 31 and normally closed by a plug 71. For the same purpose a bleed port 70a leads from the top of outer end of the cylinder 58, and normally closed by a plug 71a.

Hydraulic fluid responsive torque reaction means are entirely enclosed within the actuator envelope, so that all moving parts of the actuator are fully protectively housed. For this purpose, a piston 72 is slidably reciprocably mounted in the cylinder 58 and operatively attached by connecting rod means 73 to a torque arm 74 fixedly attached to the shaft 42, as by means of splines 75. By the relative disposition of the shaft 42 with its axis offset from the axis of the cylinder 58, but extending normal thereto, and with the torque arm 74 extending across the cylinder axis, with the connecting rod 73 connected to the torque arm 74 at the opposite side of the cylinder axis from the shaft 42, hydraulic pressure introduced into the head chamber 57 acts to effect a generally separating force between the head portion 31 and the piston 72, whereby the piston 72 drives with a torque thrust within the cylinder 58 causing the crank arm 32 to swing the actuator rotatably about the shaft 42 in the direction in which the torque arm 74 projects. At the same time, since the actuator 30 is fixedly mounted on its cover panel, an upward thrusting reaction occurs on the shaft 42, whereby the cover panel is swung toward open position. Reversal reaction occurs when the pressure fluid is introduced between the cylinder head 59 and the head end of the piston 72 for closing the associated cover panel. In each instance, when pressure fluid is introduced into one end of the actuator it is bled off under control through the opposite end, and at either end or at any intermediate point of the range of opening and closing movement, a hydraulic lock is adapted to be effected through the hydraulic actuators.

Because the torque thrust load on the piston 72 is concentrated on the diametrically opposite sides in the direction of the torque reactions in operation, a desirable construction affording bearing stability is provided. To this end, the piston 72 is provided with a relatively short cylindrical head end portion 77 provided with an annular peripheral outwardly opening seal groove 78 within which is seated a sealing ring structure 79 slidably engaging the cylinder 58. On its back end portion, the piston 72 is provided with an integral diametrically extending tongue portion 80 defined by opposite parallel slab faces 81 and affording elongated semicylindrical bearing surfaces which are continuations of the cylindrical bearing surface of the head end portion 77 and comprising stabilizing extensions thereof located in the plane within which the torque thrusts are exerted by the piston on the cylindrical wall in operation of the actuator (FIGS. 6 and 8). Each of the slab faces 81 is partially recessed about a hub 82 through which extends a connecting pin 83 and onto the outwardly projecting end portions of which are attached respective connecting loop ends of the connecting rod structure desirably comprising a pair of identical connecting rod link members 73 affording a well balanced structure. This arrangement not only affords a solid piston but reduces the piston weight while affording maximum strength in the thrust diameter and also facilitates assembly of the connecting rod 73 thereto. At the outer end of the connecting pin 83, it is desirably welded as at 84 to the respective connecting eyes of the connecting rod members 73 to effect a permanent assembly as best seen in FIG. 8 and whereby the outer sides of the eyes are maintained well inside the cylindrical plane of the piston. At its crown or head end, the piston 72 is desirably recessed as by a concave depression 85 centered opposite the cylinder head recess 64.

Connection of the opposite end eyes of the connecting rod member 73 to the torque arm 74 is through a wrist pin 87 (FIGS. 6 and 7). Desirably, the width of the torque arm 74 at its distal end portion is about the same as the thickness of the diametric thrust tongue 80 of the piston and the pair of connecting link rod members 73 therefore extend substantially parallel to one another between and alongside the torque arm and the piston tongue. Preferably, the wrist pin 87 is mounted in a bearing 88 in the torque arm 74 and the opposite end portions of the wrist pin which project to opposite sides of the torque arm are of a reduced diameter to receive the connecting eyes of the connecting rod members 73. Outwardly facing respective annular limit shoulders 89 are provided on the wrist pin at the inner ends of the connecting projections thereof and against which the inner faces of the connecting rod eyes are received and provide bearing retainers. Desirably, the connecting rod eyes are fixed to the attached end portions of the wrist pin as by means of welding 90.

In order to achieve optimum structural integrity, it is important that the openings into the substantially spherical, high burst-resistant head portion 31 of the housing to receive the shaft 42 therethrough be as small as possible, consistent with adequate shaft diameter to withstand the bending stresses imposed thereon in operation. Hence, assembly of the piston 72, the connecting rods 73 and the torque arm 74 as a fully connected unit is through the cylinder head end of the housing. Within the chamber 57, the hub portion of the torque arm 74 is received between the inner ends of symmetrically constructed inwardly projecting reinforcing and bearing bosses 91 integral with the head shell 31 and defining together with aligned outwardly projecting respective bearing hub bosses 92 elongated, shaft-stabilizing bearing bores which, in this instance, are of equal diameter sufficient to clear the splines 75 on the perimeter of the shaft 42 when assembling the shaft endwise through one of the bearing bores and through the splined eye of the hub portion of the torque arm 74 within the centering and clearance slot between the ends of the bosses 91.

Bearings for the shaft 42 in the bearing bores desirably comprise sleeve or bushing members 93 whereby to maintain the bearing bores as small as practicable in respect to shaft diameter. Such bushing bearings within the relatively small diameter but long bearing bores also efficiently distribute bending loads along the substantial length of the shaft engaged thereby to avoid shaft deflections under the considerable side thrusts that the shaft must withstand in operation. Since the internal bearing bosses 91 are off center in the generally spherical head portion 31 they are adequately supported by the spherical surface areas of the sphere and avoid stress concentrations in the housing since the ends of such bosses are in relatively cantilevered relation with the bearings closely adjacent to each side of the torque arm 74.

Lubrication of the bearings 93, as well as other movable bearing surfaces within the actuator housing is adequately effected by the hydraulic fluid, and more particularly oil, with which the unit is filled and serviced. To prevent leakage of fluid past the end portions of the shaft 42 respective annular high pressure seals 94 are mounted about the shaft at the outer ends of the bearings 93 and seal retaining end cap members 95 (FIGS. 4 and 7) are secured on the ends of the hubs 92 as by means of screws 97. Any leakage past the seals 94 due to high working pressures within the chamber 57, is stopped by annular low pressure seals 98 mounted in the inner perimeter of the end cap flanges 95. For complete safety against any leakage, drain-off means including a drain-off port 99 may be provided in each of the cap flanges 95 leading from the area between the seals 94 and 98 and from a leakage collection groove 95a located in the inner axial face of each cap flange adjacent the inner edge of an annular face seal 95b. The ports 99 are suitably connected by drain duct means with a low pressure portion of the operating hydraulic circuitry. A desirable additional function of the end cap flanges 95 is to retain the shaft 42 against axial displacement and for this purpose opposed annular retaining shoulder means 100 are provided on the shaft and the cap flanges.

In some installations, the actuator torque shaft need extend only from one side of the head end portion and it is therefore desirable to maintain the opposite end portion of the shaft enclosed. Such an arrangement is shown in FIG. 9 wherein primed reference numerals corresponding to the reference numerals identifying similar parts in FIGURE 7 have been applied and it will be understood that the same description applies to such parts or elements even though not again here repeated. In this arrangement, a blind end cover 101 is secured as by means of screws 102 onto the end of one of the hubs 92' and provides a retainer for a hardened thrust flange 103 which may, for example, be made from bronze, which is clamped against the end of the hub 92', serves as a retainer for the high pressure seal 94' and provides an end thrust stop for the shaft 42'. Axial displacement of the shaft 42' away from the thrust flange 103 is restrained by a retainer flange plate 104 having its margin in overlapping relation to the annular thrust flange 103 and is secured to the end of the shaft as by means of screws 105. Fluid leakage past the high pressure seal 94' is adapted to be drained off from an accumulator chamber 107 provided within the inner face of the cover 101 and adapted to be drained off through a port 108.

In FIGURES 10 and 11 a hatch cover assembly 20' is depicted which is generally similar to the hatch cover 20 and substantially similar parts and elements are identified by primed reference numerals and it will be understood that the same description applies as for correspondingly identified elements in the assembly 20. In the assembly 20', however, the cover actuators 30' embody the features of the blind end shaft construction including the cap 101, since in this construction, a rigid connecting bar 109 is attached as by means of a splined connection directly to the end portions of the actuator shafts 42' projecting from one side of the aligned actuators 30'. In order to pass under adjacent portions of the beams 37' running along the joint edges of the cover panels 23' and 24', the connecting bar 109 is desirably of generally U-shape, as shown.

Stable rigid mounting of the actuators 30' on their respective cover panels, and in respect to the connecting arm 109, is effected in part by securing the boss 33' on the head 31' adjacent to the blind end cover 101 to the cover panel bracket 35'. On the opposite side of the actuator 30' an integral bracket 110 on the crank lever portion 32' adjacent to the head 31' is attached as by means of a bolt 111 to a suitable bracket 112 on the associated cover panel. In addition, the rear end portion of the actuator is attached to the frame of the cover panel, as by means of the attachment lug or boss 38' secured by the nut 39' to the cover frame bracket 40'.

Coordinated opening and closing movements of the cover panels 23' and 24' is effected by means of a rigid coordinating link 113 which, in this instance, if of generally L-shape having one end portion secured by pivot pin means 114 to a rigid bracket 115 on the cover panel frame, herein of the cover panel 23', although it might alternatively be on the cover panel 24'. The bracket 115 is located adjacent to the upper side of the joint margin of the associated cover panel. Thence, the link 113 extends downwardly and then laterally across the joint between the panels and is pivotally connected at its opposite ends by means of a pivot pin 117 to a bracket 118 mounted on the cover panel 24', such that the pivots 114 and 117 are on a diagonal line relationship which extends across a line between the axes of the shafts 42' of the rotary actuators. As will be observed, the link 113 is located as reasonably close as practicable to the aligned and coupled actuators 30', and in this instance, on the opposite side of the actuators from the shaft-connecting bar 109. In FIGURE 12 is shown an arrangement wherein to meet particular structural, frame, mechanism, and like, problems the actuators 30' may desirably be offset from one another instead of in straight alignment, and therefore a shaft-connecting bar 119 is splined onto the actuator shafts 42' of the relatively staggered or offset actuators.

Where the frame structure of the hatch covers, and particularly the main beams alongside the hinge joint are located in sufficiently spaced relation, or the frame structure is otherwise adaptable to the reception of hatch actuators combined into a functionally single housing, the arrangement disclosed in FIGURE 13 may be utilized. In this arrangement, actuators 130 of the piston-lever type, in general respects similar to the actuators 30, have generally spherical hollow head portions 131 and straight crank lever arm hollow cylinder portions 132 which are secured together in end-to-end concentric relation as by means of annular respective end flanges 133 fastened together as by means of bolts 134. Thereby, the housings of the actuators 130 replace and serve the function of the shaft-connecting bar utilized with the hatch actuators of the arrangements described hereinabove.

Each of the actuators 130 is pivotally mounted on a shaft 135 in substantially the same manner as the actuators 30 and with those parts of the head portion 131 which are offset from the cylinder portion 132 to accommodate the offset transverse relationship of the shafts 135 to the cylinder axis being disposed upwardly toward the deck portion of the hatch covers and the joint afforded by the connected flanges 133 being centered in the joint between the hatch panels. In this instance, each of the shafts 135 is fixedly, nonrotatably mounted on its hatch panel frame as by means of brackets 137 rigidly supported by respective beams 138 of the cover panel frame. Within the hollow head portions 131, respective torque arms 139 are fixedly and nonrotatably mounted on the respective shafts 135 and project generally across the axis of the associated cylinder 132, with connecting rod means 140 attaching the distal end portions of the torque arms to respective pistons 141 reciprocably mounted in the respective cylinder portion 132. The arrangement is such that hydraulic fluid introduced concurrently into the head portions 131 acting on the pistons 141 effects a cover panel opening reaction on the shafts, and hydraulic pressure introduced between the heads of the pistons effects the reverse reaction, namely a closing movement of the cover panels.

Coordination of the opening and closing movements of the hatch is effected by means of one or more coordinating links 142 extending across the hatch cover joint and with the respective opposite ends attached by pivot pins 143 to brackets 144 rigid with the respective cover panels and disposed in a diagonal plane or on a line which is diagonal to a plane or line between the axes of the shafts 135.

In FIGURES 14 and 15, another arrangement is depicted in which the housings of the actuators are joined, and afford a shorter overall operating unit to be accommodated in closer relative spacing of the frame structures and within a shallower space adjacent to the hinge joint of the hatch covers. To this end, a pair of piston lever hatch actuators 150 is provided with the housings thereof joined side-by-side in head-to-tail relationship, and here the housings may comprise a single rigid casting. Each of the actuator sections 150 of this composite unit comprises a substantially spherical hollow head 151 and a straight hollow elongated cylindrical portion 152 on the same order as the actuators 30. Within the actuators 150 hydraulically motivated reaction mechanism comprising piston, connecting rod and torque arm structure is provided with the torque arm fixedly and nonrotatably attached to a shaft 153 on which each of the respective head portions 151 is rotatably mounted in substantially the same manner as described in respect to FIGURE 9 in that the shaft has one end portion extending from the side of the head 151 opposite to the integrally attached cylinder portion of the companion actuator while the opposite end of the shaft is blind end journaled. The projecting end of each of the shafts 153 is fixedly secured as by means of splines 154 to a supporting bracket 155 rigidly supported by frame beam structure 157 of the associated cover panel. In coaxial alignment with the shaft 153, in each instance, the companion actuator has mounted on the tail end portion of the cylinder 152 an idler hinge stub shaft 158 rotatable in a bracket 159 on the frame beam 157. Hydraulic pressure fluid introduced as through respective ducts 160 into the head portions 151 causes hatch-opening operation of the joint actuators, while hatch-closing operation is effected by introduction of hydraulic fluid through a respective hydraulic duct 161 connected through a cylinder head 162.

Coordination of the hatch covers with which the composite or joined twin hatch covers 150 are operatively associated is effected by means of one or more coordinating links 163, shown as of the L-shaped form for convenience extending across the hinge joint attached at one end through a pivot pin 164 to a bracket 165 and at the opposite end through a pivot pin 167 to a bracket 168 and with the pivot disposed so that a line or plane joining the same will extend diagonally across a line or plane between the axes of the actuator shafts 153.

It will be understood that modifications and variations may be effected without departing from the scope of the novel concepts of the present invention.

I claim as my invention:

1. A closure assembly of the character described including a pair of closure panels adapted for side-by-side closing disposition over an opening and having a joint therebetween about which the panels are foldable into an open position and comprising:
   a frame structure in each panel,
   a respective rotary actuator fixed to each said frame structure and including a head portion adjacent to said joint and a lever crank arm portion projecting from said head portion away from the joint,
   a respective shaft rotatably mounted in each of said head portions parallel to said joint and having an extension portion projecting substantially from said head portion,
   a bearing structure mounted on said frame structure and journaling the end portion of the shaft extension remote from the associated actuator head portion,
   a fixed connecting bar secured to and between said end portions of the shafts and thereby maintaining the shafts against rotation relative to one another, and
   reaction means in said actuators coactive with said shafts and with said crank arm lever portions for effecting movements of the closure members about said joint.

2. A closure assembly of the character described comprising, a pair of closure panels adapted for side-by-side closing disposition over an opening and having a joint therebetween about which the panels are foldable into an open position and comprising:
   a frame structure in each panel,
   a respective rotary actuator fixed to each said frame structure and including a head portion adjacent to said joint and a lever crank arm portion projecting from said head portion away from the joint,
   a respective shaft rotatably mounted in each of said head portions parallel to said joint and having an extension portion projecting substantially from said head portion,
   a bearing structure mounted on said frame structure and journaling the end portion of the shaft extension remote from the associated actuator head portion,
   a fixed connecting bar secured to and between said end portions of the shafts and thereby maintaining the shafts against rotation relative to one another,
   reaction means in said actuators coactive with said shaft and with said crank arm lever portions for effecting movements of the closure members about said joint,
   each of said bearing structures comprising a flange plate having a pivot mounted thereon, and
   a movement-coordinating link for said members having its respective opposite ends pivotally connected to said pivots.

3. In a closure assembly of the character described including a pair of panels adapted to move about a hinge joint between closing and open positions, and a power actuator means for moving the panels between open and closed positions comprising:
   a pair of actuator units each of which has a housing with said housings rigidly attached together and each of which units has a head portion pivotally attached to one of the respective panels and a crank lever portion extending from the head portion toward said joint, and
   torque reaction means within said actuators coacting with said head portions and said crank lever portions for effecting the opening and closing movements of the panels.

4. A closure assembly as defined in claim 3, in which said crank lever portions are fixed in end-to-end relation.

5. A closure assembly as defined in claim 3, in which said crank lever portions are disposed in side-by-side relation and extend across said joint.

6. In a rotary actuator construction for powering closure members:
   a rigid housing having a hollow head end portion and an elongated hollow crank lever portion defining a cylinder opening into said head portion,
   a shaft journaled in said head portion and extending across the interior thereof and having a laterally projecting torque thereon,
   a piston reciprocably mounted in the cylinder and having connecting rod means connecting the piston to said torque arm,
   a cylinder head closing said cylinder at its end remote from said head portion,
   means for introducing hydraulic fluid into said head portion at a point substantially below its top, and into said cylinder through said cylinder head for driving said piston, and
   separate means for purging air from within the top of said housing.

7. In a rotary actuator construction of the character described,
   a housing having a hollow head portion and a crank lever arm portion extending therefrom and defining an internal cylinder opening into the head portion,
   a piston in said cylinder,
   aligned bearings at openings into opposite sides of said head portion on a transverse axis offset from the cylinder axis,
   a shaft journalled through said bearings and having opposite ends projecting beyond said head portion,
   a torque arm rigid on the shaft within said head portion and extending across the cylinder axis,
   connecting rod means connecting the piston to said torque arm,
   end cap closure members secured to the head portion about said shaft,
   and opposed shoulders on said shaft and said end cap members retaining the shaft against endwise displacement.

8. In a rotary actuator of the character described including a hollow head portion and a crank arm cylinder portion extending therefrom,
   a piston operable in said cylinder portion and having a connecting rod structure extending therefrom,
   aligned openings into opposite sides of said head portion on an axis transverse to the axis of said cylinder,
   a shaft journaled on the axis of said openings and having one end extending beyond the head portion through one of said openings,
   a torque lever on said shaft within said head portion and connected to said connecting rod portion,
   a blind end cover closing the remaining side opening,
   a thrust ring clamped to the head portion by said cover and opposing said opposite end of the shaft in thrust relation,
   and a retainer secured to the end of the shaft and disposed between the cover and the thrust ring in opposing relation to said thrust ring to retain the shaft against axial displacement away from the thrust ring.

9. A structure of the character described comprising a member arranged to be swung between two different positions nad including a shaft about which the member rotates in said swinging movements and a rotary actuator for effecting said swinging movements, the combination comprising:
   a head portion on the actuator journalled on said shaft;
   a crank lever portion on said actuator extending from said head portion with a cylinder therein and a piston reciprocable in the cylinder and operatively connected to the shaft to produce a reaction causing the crank lever portion to swing in one direction upon movement of the piston in one axial direction in the cylinder and to swing in the opposite direction upon movement of the piston in the opposite axial direction in the cylinder;
   a cylinder head closing the end of said cylinder remote from said head portion;
   a projection from said cylinder head;
   and means fixedly securing said projection to said member.

10. The structure of claim 9, in which said projection comprises a boss having a port therethrough to the inside of the cylinder head, and means for introducing pressure fluid into the cylinder through said port.

11. In a rotary actuator of the character described including a hollow head portion and a crank arm cylinder portion extending therefrom:
   a piston operable in said cylinder portion and having a connecting rod structure extending therefrom;
   aligned openings into opposite sides of said head portion on an axis transverse to the axis of said cylinder portion;
   a shaft journaled on the axis of said openings and having one end extending beyond the head portion through one of said openings;
   a torque lever on said shaft within said head portion and connected to said connecting rod structure;
   a blind end cover closing the remaining side opening;
   and a thrust member clamped to the head portion by said cover and opposing said opposite end of the shaft in thrust relation and maintaining it spaced from said end cover.

12. A closure assembly of the character described in which two closure members are arranged for movement between a closing position over an opening and an open folded position about a joint between the members and comprising:
   frame structure on each of the members;
   a respective rotary actuator mounted fixedly on each frame structure adjacent to said joint;
   a respective shaft about which each of said actuators is rotatable and each shaft having an end projecting therefrom on an axis parallel to said joint;
   means fixedly connecting said shafts against relative rotation;
   said actuators having means coacting with said shafts and said actuators for moving the members pivotally about the respective shafts and between said closing and open positions;
   said shafts including extensions and said frame structure having bearing flanges thereon journalling said extensions;
   and a movement-coordinating link pivotally attached at its respective opposite ends to respective portions of said flanges.

13. A closure assembly of the character described including a pair of closure panels adapted for side-by-side closing disposition over an opening and having a joint therebetween about which the panels are foldable into an open position and comprising:
   a frame structure in each panel;
   a respective rotary actuator fixed to each said frame structure;
   a respective shaft about which each of said actuators is rotatable and said shafts being parallel to said joint and each having an extension portion projecting substantially from its actuator;
   a frame beam substantially spaced from the actuators and extending across the axes of said shafts;
   respective bearing structures mounted on said beam and journalling the end portions of the shaft extensions and with said extensions extending through the beam;
   a fixed connecting bar secured to and between said end portions of the shaft at the side of the beam which is remote from the actuators and thereby maintaining the shafts against rotation relative to one another;
   and reaction means operative between and coactive with said shafts and said actuators for effecting movements of the closure members about said joint.

14. A closure assembly as defined in claim 13, in which each of said shafts is solid and has a short section extending from its actuator, and each of the extension portions comprising a tubular member.

15. A closure assembly as defined in claim 14, including a coupling on each of the shaft extension members splined onto the solid shaft outwardly projecting section, and each of the tubular members having a journal on its end portion remote from said coupling and journalled in its respective bearing structure mounted on said beam.

16. A closure assembly as defined in claim 13, including respective pivots mounted on said beam adjacent to said joint and on said side remote from the actuators, and a movement-coordinating link having its respective opposite ends pivotally connected to said pivots and lying in a plane between said connecting bar and said beam.

17. The structure of claim 9, in which said cylinder head is dome-shaped, and said projection comprises a central boss providing a port for introduction of pressure fluid into the cylinder.

18. A structure of the character described comprising a member arranged to be swung between two different positions and including a shaft about which the member rotates in said swinging movements, and a rotary actuator for effecting said swinging movements comprising:
   a housing having a hollow head portion journalling said shaft;
   a torque lever fixedly mounted on the shaft within said head portion;
   a crank arm portion on the housing extending from said head portion attached to said member and having a hollow cylinder therein opening into said head portion;
   a piston slidably reciprocal in said cylinder and having a cylindrical head end portion and a diametrical tongue opposite end portion provided with diametrically opposite cylinder extensions and affording oppositely facing parallel slab sides;
   and connecting rod means pivotally attached at one end to said tongue portion along said slab sides and pivotally attached at the opposite end to said torque lever;
   said torque lever and said tongue being in a common plane.

19. A structure of the character described comprising a member arranged to be swung between two different positions and including a shaft about which the member rotates in said swinging movements, and a rotary actuator for effecting said swinging movements comprising:
   a housing having a hollow head portion journalling said shaft which extends across the interior of the head portion;
   a torque arm fixed on said shaft within said head portion;

a crank arm portion on the housing extending from said head portion attached to said member and having a hollow cylinder therein opening into said head portion;

a piston reciprocably mounted in said cylinder and having a head end portion with an opposite diametric tongue projecting toward said torque arm;

respective wrist pins extending through said torque arm and said tongue and having opposite projecting end portions, and a pair of connecting rod members having opposite connecting eyes respectively attached to respective end portions of said wrist pins.

20. A structure as defined in claim 19, including means permanently securing said connecting rod member eyes to the attached end portions of the wrist pins.

References Cited

UNITED STATES PATENTS

| | | | |
|---|---|---|---|
| 2,855,038 | 10/1958 | Greer | 160—188 |
| 3,118,310 | 1/1964 | Jablonsky | 74—105 |
| 3,224,491 | 12/1965 | Hamilton | 160—188 |
| 3,288,202 | 11/1966 | Rumsey | 160—188 |

DAVID J. WILLIAMOWSKY, *Primary Examiner.*

PETER M. CAUN, *Examiner.*